INVENTOR.
SIGMUND MACHLANSKI
BY
ATTORNEY

April 23, 1957 S. MACHLANSKI 2,789,418
SINGLE LEVER CONTROLLED STARTING AND POWER
CONTROL DEVICE FOR AN AIRCRAFT ENGINE
Original Filed Sept. 20, 1950 8 Sheets-Sheet 6

INVENTOR.
SIGMUND MACHLANSKI
BY
*Herbert L. Davis*
ATTORNEY

FIG. 9

INVENTOR.
SIGMUND MACHLANSKI
BY
*Herbert L Davis*
ATTORNEY

FIG. 10

INVENTOR.
SIGMUND MACHLANSKI
BY
ATTORNEY

United States Patent Office 2,789,418
Patented Apr. 23, 1957

2,789,418

SINGLE LEVER CONTROLLED STARTING AND POWER CONTROL DEVICE FOR AN AIRCRAFT ENGINE

Sigmund Machlanski, Hackensack, N. J., assignor to Bendix Aviation Corporation, Teterboro, N. J., a corporation of Delaware Original application September 20, 1950, Serial No. 185,828, now Patent No. 2,740,255, dated April 3, 1956. Divided and this application January 25, 1952, Serial No. 268,303

8 Claims. (Cl. 60—39.2)

The present application is a division of the copending application Serial No. 185,828, filed September 20, 1950 by Sigmund Machlanski, now Patent No. 2,740,255 and relates to improvements in a control system for a turbine driven aircraft engine and more particularly to a novel single control means for effecting starting, ground and flight operation of an aircraft engine.

In the copending application Serial No. 158,273, filed April 26, 1950 by Sigmund Machlanski, now Patent No. 2,741,086, there is disclosed and claimed an automatic starting control on which the subject matter of the present application involves certain improvements.

An object of the invention is to provide a novel manually operable control to determine the operating condition of the control system.

Another object of the invention is to provide a manually operable mechanism having a single control lever to effect through a system of switches on automatic starting and power control system for an aircraft engine.

The above and other objects and features of the invention will appear more fully hereinafter from a consideration of the following description taken in connection with the accompanying drawings wherein one embodiment of the invention is illustrated by way of example.

Figure 4:
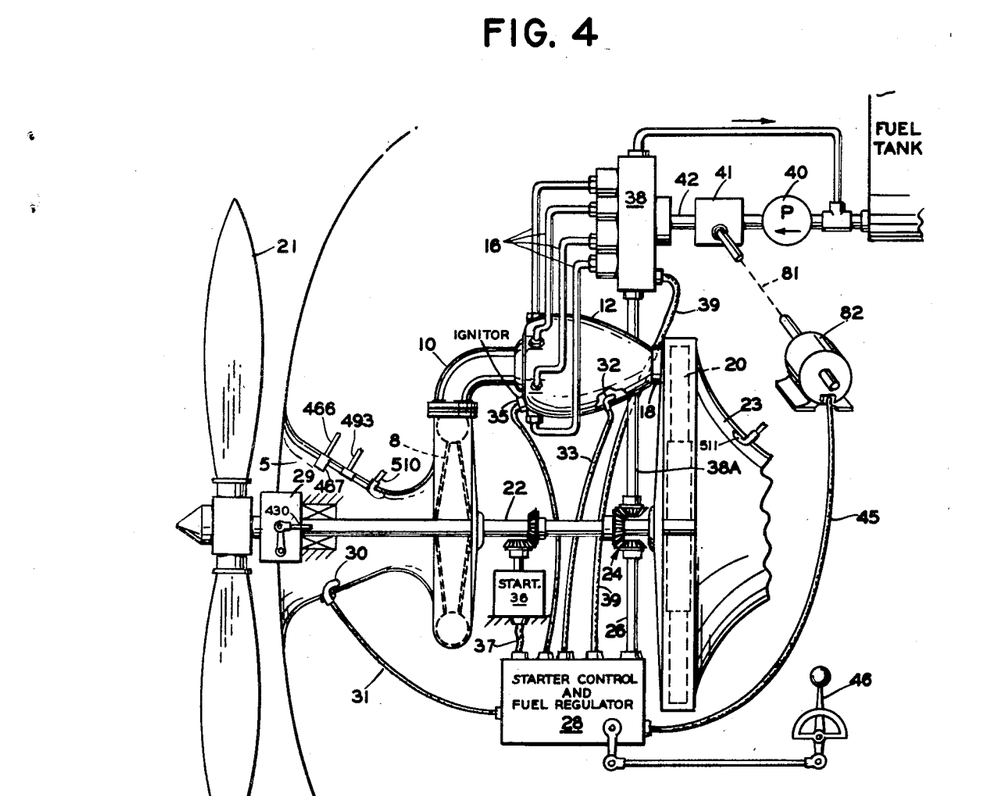
Figure 4 is a diagrammatic view of an aircraft engine or gas turbine with which the systems shown in Figures 1, 2 and 3 are designed for use.

Referring to the drawing of Figure 4, there is indicated by the numeral 2 an aircraft of a type with which the subject invention is designed for use. The aircraft in flight moves toward the left as viewed in Figure 4 so that air is rammed into an intake 5. The ram air is in turn compressed by a blower or compressor 8 and flows through a conduit 10 into a combustion chamber 12. Fuel at a controlled rate is fed through lines 16 into the combustion chamber 12.

The products of combustion flow out through a nozzle 18 to drive a turbine 20 which drives the compressor 8 and a propeller 21 through a shaft 22. The exhaust exits through passage 23. Gearing 24 and a shaft 26 connects the shaft 22 with a flyball speed governor 27 of Figures 1 and 3 of the automatic starter control and fuel regulator 28 hereinafter explained.

Temperature responsive device 30 sensitive to the temperature of the air at the intake 5 is operably connected through a conduit 31 to the fuel regulator for purposes hereinafter explained, while a temperature responsive device 32 is mounted at a suitable point in the combustion chamber 12 for sensing the temperature of the combustion gases. The device 32 is operably connected through a conduit 33 to the fuel regulator and starter control 28. A suitable ignitor 35 is provided for initially igniting the combustion gases in the chamber 12. The ignitor 35 may be of conventional type and is operably connected through a suitable electrical conduit to the starter control 28.

Also arranged for driving the turbine shaft 22 in starting is a suitable starting mechanism indicated herein generally by the numeral 36 and operably connected through electrical conduit 37 to the starter control. The starting mechanism 36 may be arranged to engage the shaft 22 in driving relation during starting and disengage the shaft 22 after starting by suitable means, well known in the art.

The fuel input lines 16 may be controlled by a suitable fuel equalizer valve 38 of a type disclosed and claimed in my copending application Serial No. 158,274 filed April 26, 1950 and having maximum speed limiting means operatively connected to the shaft 22 through a shaft 38A as explained in the latter application.

The fuel equalizer valve 38 may be controlled by the automatic starter control 28 through an electrical conduit 39 operatively connected to the control 28. The equalizer valve 38 may be supplied with fuel under pressure of a pump 40 through a throttling valve 41 in a supply conduit 42.

Figure 11:
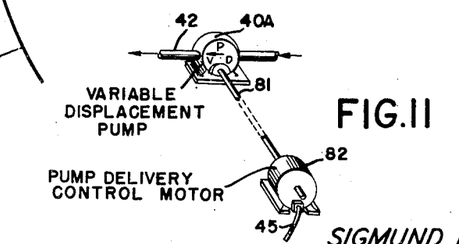
Figure 11 is a diagrammatic view showing a modification of the system of Figure 4 in which there is shown a fuel pump of the variable displacement type controlled by a suitable motor.

The throttling valve 41 may be of conventional type operatively controlled through a shaft 81 by a reversible electric motor 82 connected through an electrical conduit 45 with the control system indicated generally by the numeral 28 and hereinafter explained with reference to Figures 1 and 3. Instead of a throttling valve, there may be used a variable displacement pump 40A controlled by the motor 82 to vary the supply of fuel to the combustion chamber 12 in accordance with the demands of the regulator 28, as shown diagrammatically by Figure 11. A manually operable control indicated in Figure 4 generally by the numeral 46 may be adjusted by the pilot in flight to vary the setting of the regulator 28 to select the regulated combustion chamber temperature. The control 46 may be of a type shown in detail in Figures 5–8 to effect the several control functions as hereinafter explained.

As will appear hereinafter, the control system is designed for five phases of operation as follows:

1. Cut-off—when the engine is at rest and the fuel line has been closed by the equalizer valve 38 and throttling valve 41 and the control lever 46 has been adjusted to the "cut-off" position as indicated by letter A of Figure 6.

2. Starting operation—the system of control for which is shown by Figure 1 with the control lever 46 adjusted to "start ground idle" position indicated by letter B of Figure 6.

3. Ground idle operation effective immediately after the starting cycle has been completed—the system of control for which is shown in Figure 3 with the several switches adjusted as shown in dotted lines by the designation (3) and with the control lever 46 remaining in the previous position B.

4. Normal ground operation—the system of control for which is shown in Figure 3 with the several switches adjusted to the position shown in dotted lines by the designation (4) and with the control lever 46 adjusted to the "ground operation" position indicated by letter C of Figure 6.

4(a). Movement of the control lever 46 from position C to position D controls the angle of propeller 21 in reverse pitch for taxiing only.

4(b). Movement of the control lever 46 from position C to position E controls the angle of propeller 21 in forward pitch for taxiing only.

5. Flight operation—the system of control for which is shown in Figure 3 with the several switches adjusted to the positions shown in solid lines by the designation (5) and with the control lever 46 adjusted from position E of Figure 6 to F for flight minimum power and toward position G to progressively increase the flight power to maximum.

Figure 1:
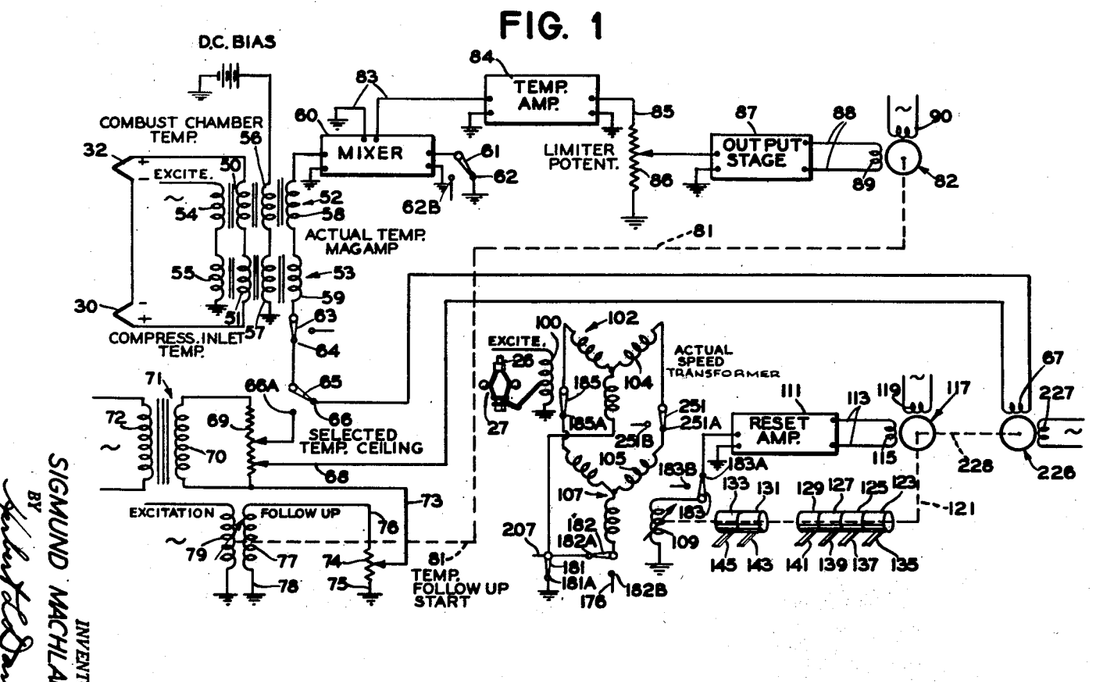
Figure 1 is a diagrammatic view showing a temperature responsive fuel control system for the automatic starting of a turbine driven engine in which there is provided a speed responsive mechanism for effecting the necessary accessory functions in the starting operations.

*System of control for starting operation—Figure 1*

Referring to the drawing of Figure 1, there is shown diagrammatically as disclosed and claimed in the copending application Serial No. 158,273 now Patent No. 2,741,086 a system of control for starting a turbine type engine in which the temperature responsive elements 32 and 30 are shown as thermocouples connected in a loop circuit including control windings 50 and 51 of magnetic amplifiers 52 and 53. The magnetic amplifiers 52 and 53 include serially connected excitation windings 54 and 55 connected across a main source of constant frequency alternating current. The magnetic amplifiers 52 and 53 also include D. C. bias windings 56 and 57 and the control windings 58 and 59 inductively coupled to the excitation windings 52 and 53, respectively. The thermocouples 30 and 32 are connected in opposing relation so that the control signal energizing the windings 50 and 51 will represent the difference between the temperatures at the compressor inlet and at the combustion chamber 12 which will in turn vary the induced voltage in the regulated windings 58 and 59 in direct relation to the difference between such temperatures.

The windings 58 and 59 are serially connected to one of the inputs of a mixer circuit indicated generally by the numeral 60. The mixer circuit 60 may be of a conventional type or may be of a type such as disclosed in the copending application Serial No. 156,260 filed April 17, 1950 by William E. Brandau now Patent No. 2,727,356.

The other input to the mixer circuit 60 is grounded during starting operation by a switch 61 closing grounded contact 62. The opposite end of the serially connected control winding 58 and 59 is connected through a switch 63 which during the starting operation closes a contact 64 and through a second switch 65 which during the starting operation closes a contact 66 so as to connect in series with the control windings 58 and 59 an output winding 67 of a rate generator, the purpose of which will be explained hereinafter.

The opposite end of the generator winding 67 is connected through a conductor 68 to a point on a potentiometer 69 which potentiometer is connected across a secondary winding 70 of the transformer 71. The transformer 71 has a primary winding 72 connected across the main source of constant frequency alternating current so as to induce in the secondary winding 70 a voltage acting in opposition to the voltage induced in the control windings 58 and 59. One end of the potentiometer 69 is connected by a conductor 73 to a point of the potentiometer 74 having one end grounded at 75 and the other end connected by a conductor 76 to a follow-up winding 77 grounded at 78. Inductively coupled to the followup winding 77 is a rotor winding 79 connected across the main source of alternating current and positioned through a shaft 81 by actuator motor 82 as will be explained hereinafter.

It will be seen then that upon the voltages induced in the winding 70 and control windings 58 and 59 being unbalanced a signal voltage will be applied through the mixer system 60 to output lines 83 of the mixer system to the input of a suitable amplifier 84. The amplifier 84 may be of a conventional type or may be of a type such as disclosed in U. S. Patent No. 2,493,605 granted January 3, 1950 to Adolph Warsher and assigned to Bendix Aviation Corporation.

The output of the amplifier 84 leads through output lines 85 to a limiter potentiometer 86 and thence to an input of an amplifier 87, likewise of conventional type. Output 88 from the amplifier 87 leads to the control winding 89 of a two phase actuator motor 82 having its fixed phase winding 90 connected across the main source of alternating current.

The actuator motor 82 is arranged to drive through the shaft 81 the throttling valve 41 so as to increase or decrease the flow of fuel to the engine depending upon the direction of unbalance of the main control system including control windings 58, 59 and 70. In actuating the shaft 81 in an opening direction, for example, to increase the fuel supply to the engine in response to a call for increase in temperature, the shaft 81 will also adjustably position the follow-up rotor winding 79 so as to induce in the winding 77 a voltage tending to counteract the signal voltage calling for increase in fuel or temperature and thereby in effect decreasing the temperature setting with movement of the valve in an opening direction by the motor 82. Similarly, upon the temperature tending to exceed the selected ceiling temperature, the motor 82 will position the valve in a closing direction and the followup winding 79 in a direction tending to induce a voltage in the winding 77 counteracting the signal voltage calling for a closing movement of the throttling valve and tending to increase the temperature setting.

It is seen then that as speed of the turbine continues to increase at ceiling temperature drawing more air into the combustion chamber 12 and calling in turn for increase in fuel and temperature, the controlled variable temperature will decrease with increase in speed during this transient causing adjustment of the actuator motor 82 in a direction calling for more fuel while positioning the follow-up winding 79 so as to reset the selected temperature of the winding 70 to a lower value. This is desirable to prevent stall during fire-up.

Referring now to the drawing of Figure 1, the flyball governor 27 driven by the shaft 26 senses the speed of the turbine 20 and is arranged to adjustably position a rotor winding 100 connected across a main source of constant frequency alternating current. The winding 100 forms a rotor portion of a variable coupling transformer 102 having a stator winding 104 inductively coupled thereto. The stator winding 104 is operatively connected through suitable electrical conductors to a stator winding 105 of a second variable coupling transformer 107 having a rotor winding 109. Rotor winding 109 is connected through suitable conductors to the input of an amplifier 111 which may be a conventional type or of a type such as shown in U. S. Patent No. 2,493,605 granted January 3, 1950 to Adolph Warsher and assigned to Bendix Aviation Corporation. The output of the amplifier 111 is connected through conductors 113 to a control winding 115 of a two phase reversible servo motor 117 having another winding 119 connected across the main source of alternating current. As indicated diagrammatically in Figure 1, the servo motor 117 drives through a shaft 121 suitable rotary switch elements 123, 125, 127, 129, 131 and 133 and also the rotary winding 109 so as to follow the position of the first winding 100. Thus adjustment of the rotor winding 100 in response to a change in speed as sensed by the governor 27 will cause through the servo motor 117 a like adjustment of the rotor winding 109 to a null position together with adjustment of the rotary switch elements 123–133.

Cooperating with the rotary switch elements 123–133 are respective brush elements 135, 137, 139, 141, 143 and 145 which cooperate with the relay switch system shown diagrammatically in Figure 2 as hereinafter explained.

*Switching system*

Figure 2:
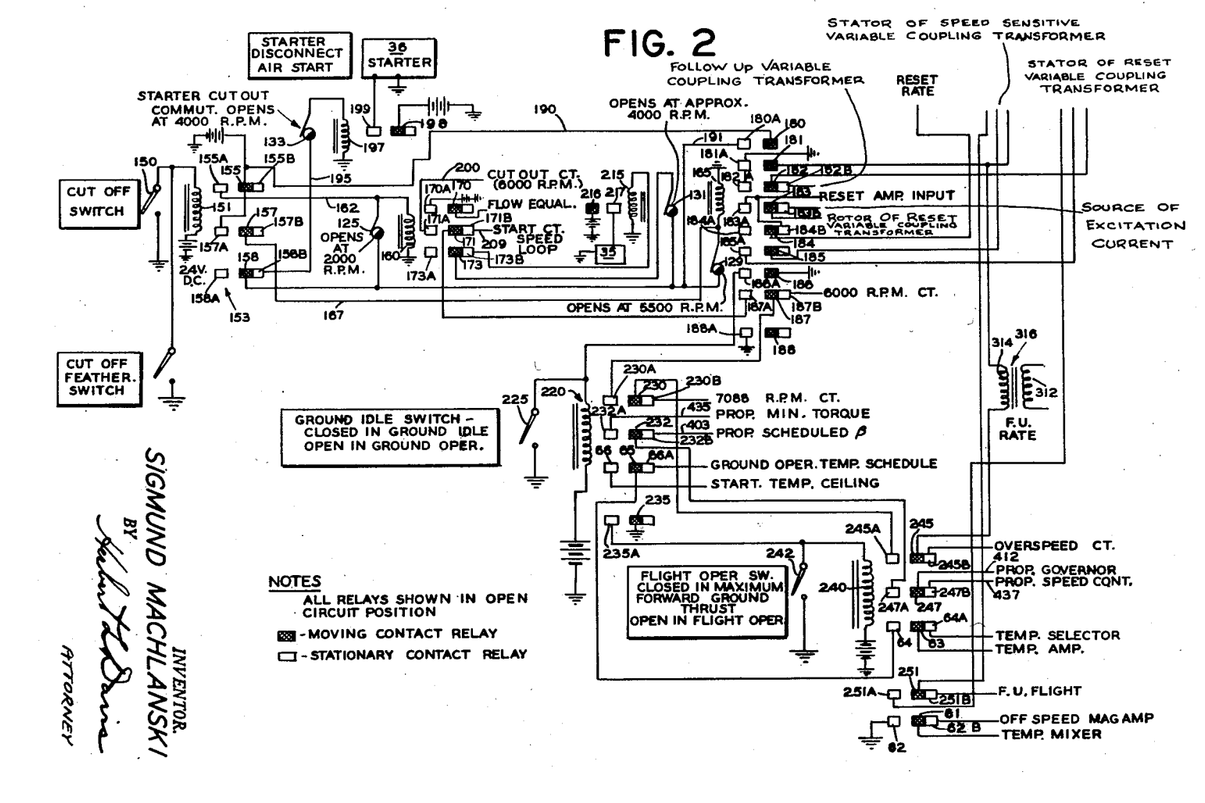
Figure 2 is a diagrammatic view showing the switching system for the automatic starter control operated by the speed responsive mechanism of Figure 1.

Referring now to Figure 2, in order to effect the automatic starting operation, a cut-off switch indicated by the numeral 150 must be first closed so as to effect energization of a relay winding 151 of the relay mechanism 153 having movable contacts 155, 157 and 158. Such energization of the winding 151 will then cause contact 155 to close contact 155A while contact 157 closes contact 157A and contact 158 engages an open contact 158A. The closing of contact 155A by the movable contact 155 will then effect energization of a relay winding 160 through line 162. The closing of contact 157A by movable contact 157 will similarly cause energization of a relay winding 165 through a conductor 167.

The relay winding 160 controls movable contacts 170, 171 and 173 and upon energization of the relay 160 the movable contact 170 closes contact 170A, the movable contact 171 closes contact 171A and movable contact 173 engages open contact 173A.

The energization of the relay winding 165 similarly causes movable contacts 180, 181, 182, 183, 184, 185, 186, 187 and 188 to close cooperating contacts 180A, 181A, 182A, 183A, 184A, 185A, 186A, 187A and 188A. The closing of contact 180A by the movable contact 180 effects through the conductor 190 and 191 a holding circuit for the relay windings 160 and 165 through the rotary switches 125 and 129 heretofore explained.

Now, when it is desired to start the engine, the cut-off switch 150 is opened causing deenergization of the relay winding 151 whereupon the movable contacts 155, 157 and 158 are biased under suitable spring means not shown, so as to open the contacts 155A, 157A and 158A and close contacts 155B, 157B and 158B. The closing of contact 158B by the movable contact 158 then effects through a conductor 195 and rotary switch 131 and 133 energization of electromagnetic winding 197. The relay winding 197 controls a movable contact 198 which upon energization of the winding 197 closes contact 199 so as to complete a circuit for effecting energization of a suitable starting mechanism 36 to drive the turbine engine. Deenergization of the winding 151 also causes the movable contact 157 to open the contact 157A and thus break the circuit through the conductor 167 to the relay winding 165, which, however, continues to be energized through the rotary switch 129 and the holding contact 180A and 180. Likewise, deenergization of relay winding 151 causes the movable contact 155 to open the contact 155A so as to open the conductor 162 to relay winding 160. The relay winding 160, however, continues to be energized through the rotary switch 125 and the holding contacts 180 and 180A.

At a predetermined driven speed of the turbine as sensed by the flyball governor 27 of, say for example, 2000 R. P. M., the flyball governor 27 causes adjustment of the rotor winding 100 of the variable coupling transformer 102 and thereby rotation of the servomotor 117 in a direction such that the rotary switch 125 opens the energizing circuit for the winding 160 whereupon movable contact 170 opens contact 170A controlling the circuit for holding the flow equalizer valve heretofore described in a shut-off position so that fuel may now flow to the combustion chamber of the engine through the equalizer valve. Similarly the movable contact 171 opens contact 171A and closes contact 171B for permitting motor 82 to open the throttling valve 41 in response to a signal for increase in temperature.

In the cut-off position, the movable contact 171 closes a contact 171A in response to energization of relay winding 160. The contact 171A, as indicated in Figure 2, is connected to a conductor 200 which, as indicated in Figure 3, leads to a point 201 on a potentiometer 202 connected across a secondary winding 203 of a transformer having a primary winding 204. The primary winding 204 connected across the main source of alternating current is arranged to induce into the winding 203 an alternating current of such a phase as to cause rotation of the actuator motor 82 in a direction to close the throttling valve 41 to passage of fuel. The output of the secondary winding 203 is connected to input conductor 205 of an amplifier 206 while the other input line 205A of the amplifier 206 is grounded. The opposite output conductor 200 from the secondary winding 203 leads through contact 171A, movable contact switch 171 and conductor 207 to a switch 181 closing a grounded contact 181A. Corresponding switches are indicated in Figure 3 by dotted lines as connecting line 200 to line 207 and line 207 to ground. The latter ground connection is effected in Figure 2 by the movable switch contact 181 which closes contact 181A upon energization of the electromagnetic winding 165.

It will be seen then that the output of the secondary winding 203 of the transformer having primary winding 204 is connected to the input of the amplifier 206 through conductor 205 and grounded conductor 205A. The amplifier 206 may be of a conventional type or may be of a type such as disclosed in the U. S. Patent No. 2,493,605 granted January 3, 1950 to Adolph Warsher and assigned to Bendix Aviation Corporation. The output 207 of the amplifier 206 is connected through a phase selector 208 having an output 208A leading to the input of the amplifier 87. The phase selector may be of a conventional type or a type such as disclosed in the copending application Serial No. 41,329 filed July 29, 1948 by William E. Brandau and is arranged to permit a signal voltage of a phase corresponding to that induced through the secondary winding 203 to the phase selector 208 to pass, while not permitting the passage, of a signal voltage of an opposite phase. The signal voltage which phase selector 208 permits to pass is of such a phase as to cause the motor 82 to drive the throttling valve 41 in a direction for closing the valve 41 to cut off the passage of fuel to the combustion chamber 12.

Now, upon the cut-off switch 150 being opened and the electromagnetic winding 160 being deenergized, as upon the turbine 20 being driven by the starter 36 to a speed sufficient to open the rotary switch 125, such as, for example, 2000 R. P. M., then the movable switch contact 171 opens contact 171A and closes contact 171B. The contact 171B, as indicated in Figure 2, is connected to a conductor 209 which, as indicated in Figure 3, leads to a point 210 on a potentiometer 211 connected across a secondary winding 213 inductively coupled to the primary winding 204 and so arranged that there is induced into the secondary winding 213 a voltage having an opposite phase relation to that induced in the secondary winding 203. The output of the secondary winding 213 is connected to the input conductor 205 of the amplifier 206 while the other input line 205A of the amplifier 206 is connected to a common ground connection to which the opposite output conductor 209 is connected through contact 171B, movable contact switch 171, conductor 207 and switch 181 closing ground contact 181A. Corresponding switches are indicated in Figure 3 by dotted lines as connecting line 209 to line 207 and line 207 to the common ground. Thus, the output of the secondary winding 213 is connected to the input of the amplifier 206. However, the phase selector 208 is so arranged that signal voltages of a phase opposite to that induced in the winding 203 are not permitted to pass through the phase selector 208. Therefore, the signal voltages from the winding 213 do not pass to the amplifier 87 from the phase selector 208 and the servomotor 82 may adjust the throttling valve 41 in an opening direction as determined by the temperature responsive control heretofore described.

Deenergization of the electromagnet 160 also causes movable contact 173 to close 173B for effecting through rotary switch 131 energization of a relay winding 215. The energization of relay winding 215 causes a movable contact 216 to close a contact 217 for effecting operation of the ignitor 35 for igniting gases in the combustion chamber 12 for starting the engine.

A fuel flowing to the combustion chamber 12 through the throttling valve 41 and the equalizer valve 38 now starts to burn and the temperature in the combustion chamber rises until the ceiling temperature set by the connection of the conductor 68 to the potentiometer 69 of Figure 1 is achieved.

Figure 3:
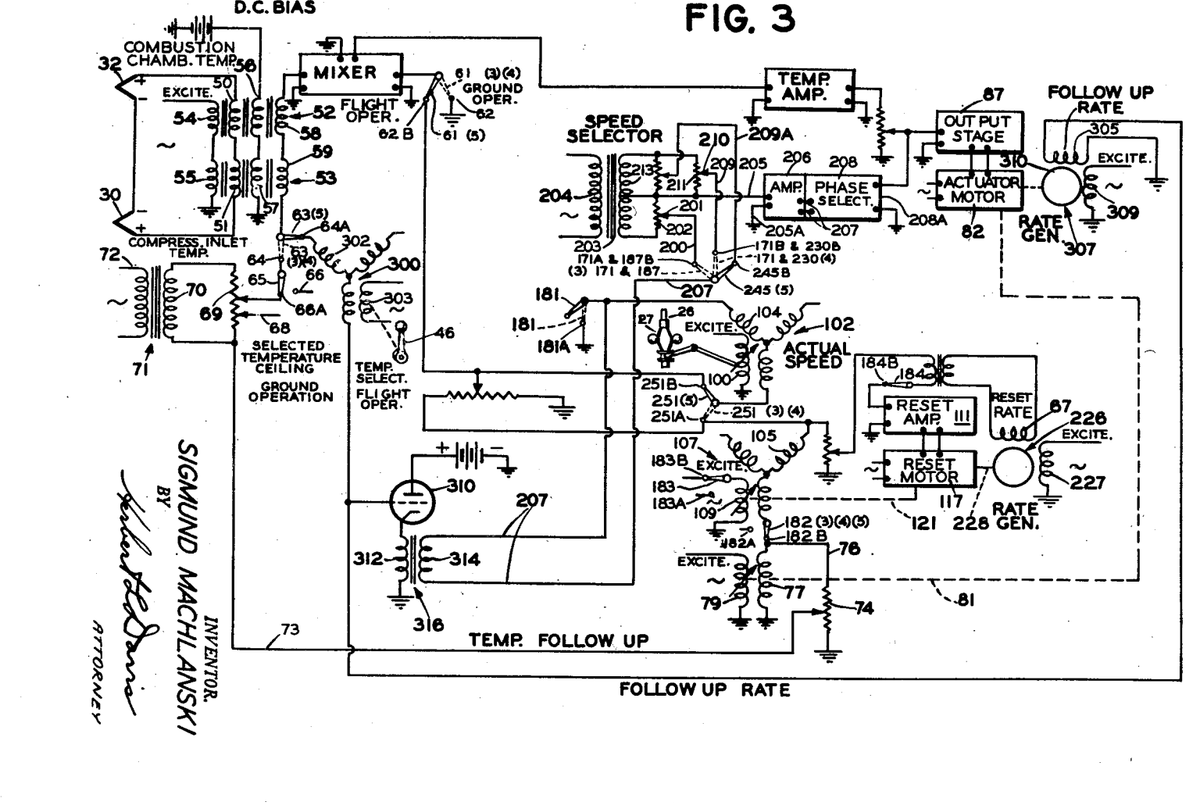
Figure 3 is a diagrammatic view showing the fuel control system for normal ground and flight operation.

It will be noted that, as shown in Figures 1–3, the movable contact 186 closes contact 186A upon energization of the winding 165, causing in turn the energization of the relay winding 220; energization of relay winding 220 in turn causes a movable contact 65 to close a movable contact 66 connecting into the temperature loop the output winding 67 of a rate generator 226. The rate generator 226 has a winding 227 connected across a main source of alternating current and has a rotor driven through shaft 228 by the servo motor 117 at a speed proportional to the acceleration of the turbine 20.

The output of the rate generator 226 has a frequency determined by the main source connected across winding 227 and the output voltage is proportional to engine acceleration and is connected in the temperature sensitive circuit by the contacts 65—66. The rate generator 226 is arranged to introduce a feed back voltage having a phase relation such as to reduce the selected temperature level with increase in engine acceleration. Since the characteristic of turbine engines is relatively poor efficiency at low speeds, a fixed operating temperature sufficiently high to guarantee acceleration of the engine at starting speed results in a runaway acceleration as the rated speed is approached. The acceleration feed back introduced by the rate generator 226 acts to moderate this tendency.

Speed continues to increase, however, at ceiling temperature and it will be noted that the control temperature setting decreases with increase in speed during this transient since the position follow-up tends to reset the selected temperature to a lower value.

This is desirable to prevent stall during fire-up.

When the turbine reaches a predetermined self-sustained speed of, for example, 4000 R. P. M. the rotary switch 133 opens to deenergize electromagnet 197 whereupon the movable contact 198 opens the contact 199 and deenergizes the starter mechanism while the rotary switch 131 opens to denergize the relay winding 215 whereupon the movable contact 216 opens the contact 217 to deenergize and extinguish the ignitor mechanism 35.

Further, when the speed of the turbine reaches an additional self-sustained speed of, for example, 5500 R. P. M., the rotary switch 129 opens the energizng circuit for the relay winding 165 whereupon the several movable contacts 180—188 open respective contacts 180A to 188A while closing the associate contacts 182B, 183B, 184B and 187B so as to transfer the circuit shown in Figure 1 to the circuit shown in Figure 3 for normal ground operation.

More precisely, a holding circuit for the relay windings 160, 165, 197 and 215 controlled by the speed sensitive switches 125, 129, 131 and 133 is broken by the opening of contacts 180 and 180A upon deenergization of winding 165 and the starting cycle cannot be reinitiated without first closing the cut-off switch 150. This arrangement thus prevents accidental re-energization of the starter and ignitor equipment in the event the engine should stall.

Furthermore, the deenergization of the electromagnetic winding 165 permits the movable contacts 181, 182, 183, 184, 185, 186, 187 and 188 under suitable spring means to open contacts 181A—188A, respectively, and close associated contacts 182B—187B, respectively, so as to transfer the connection of the speed transformer 102 and speed follower transformer 107 of Figure 1 from the system shown in Figure 1 to that shown in Figure 3 for normal operation.

Thus, deenergizaton of the electromagnetic winding 165 causes the movable contact 181 to open the contact 181A so as to open the ground connection of line 207 and the movable contact 187 to open contact 187A and close contact 187B to connect line 200 to line 207 as indicated schematically by dotted lines in Figure 3.

Further, upon such deenergizaton of the winding 165, the movable contact 182 opens contact 182A and connects the line 76 from the follow-up winding 77 to the stator winding 105 of the transformer 107, as indicated schematically in Figure 3, while movable switch contact 183 opens contact 183A to disconnect the rotor winding 109 of the transformer 107 from the input of the amplifier 111 and close contact 183B to connect the rotor winding 109 across the main source of alternating current. Thus, upon deenergization of the winding 65, the connection of the rotor winding 109 is transferred from that shown in Figure 1 to that shown in Figure 3.

Moreover, movable contact 184 upon deenergization of the relay winding 165 closes contact 184B to connect the output winding 67 of the rate generator 226 in the input line to the amplifier 111, as indicated schematically in Figure 3. Further, the switches 181, 182 and 185 are arranged, as shown in Figures 1 and 2, to transfer the connections of the transformers 102 and 107 from that shown in Figure 1 to that shown schematically in Figure 3 upon deenergization of the winding 165.

Furthermore, the movable contact 186 opens the contact 186A so as to potentially deenergize the electromagnet 220 in the event the pilot should transfer control from ground idle operation to normal ground operation by opening the switch 225. In the closed position of the switch 225, the system remains in ground idle operation and the electromagnetic winding 220 continues energized.

The movable contact 187 upon deenergization of the relay winding 165 further opens contact 187A and closes the contact 187B so as to in effect cause the switch of Figure 3 indicated in dotted lines to close the contact for a maximum speed limit of, for example, 6000 R. P. M., which serves to override the existing temperature setting as will be explained.

*Normal ground operation*

To effect normal ground operation, pilot may now move a selector switch 225 to an open position de-energizing electromagnetic winding 220 causing a movable contact 230 to open associated contact 230A and close associated contact 230B as shown in Figure 2. As shown schematically in Figure 3, the latter action serves to in effect shift the speed selector switch to the dotted line position indicated by the numerals 171 and 230 of Figure 3 so as to close a circuit through the contact indicated by numerals 171B and 230B which raises the speed ceiling to a higher value of, for example, 7088 R. P. M.

Furthermore, the de-energization of electromagnet 220 causes a movable contact 232 to open associated contact 232A and close associated contact 232B which effects a circuit for controlling the propeller pitch by a suitable mechanism indicated diagrammatically in Figure 9 and explained hereinafter. The de-energization of the electromagnet 220 causes movable contact 65 to open a contact 66, shown in Figure 1 and heretofore described, and close a second contact 66A, as shown in Figure 3, which increases the temperature ceiling of the regulating system from that of the setting of Figure 1 to that of setting of Figure 3 with switch 63 closing contact 64, as indicated by dotted lines.

The de-energization of the electromagnet 220 also causes movable contact 235 to open an associated contact 235A which potentially de-energizes a second electromagnet 240 in the event the pilot should open a switch 242 to transfer from normal ground operation to flight operation.

During ground operation with the switch 242 closed, it is expected to maneuver the airplane by maintaining the preset speed of, for example, 7088 R. P. M. of the over-speed governor and varying power by adjusting the blade angle of the propeller to give forward and reverse thrust at the same time. The speed is isochronous (dead beat, no droop) as the follower 77 is wiped out by the speed control circuit.

Flight operation

For flight operation the pilot may open switch 242 to de-energize the relay 240 whereupon movable contacts 245, 247, 63, 251 and 61 are biased by suitable spring means to open associated contacts 245A, 247A, 64, 251A and 62 respectively, and close associated contacts 245B, 247B, 64A, 251B and 62B. The opening of contact 245A and the closing of contact 245B in effect shifts the speed selector switch 245 of Figure 3 to close a contact 245B as indicated by solid line in Figure 3 which increases the speed level from the previously selected value of, for example, 7088 R. P. M. to a higher level of, for example, 7200 R. P. M.

Moreover, the opening of contact 247A and the closing of the contact 247B puts the propeller pitch governor in normal speed control as hereinafter explained.

Further, the opening of contact 64 and the closing of contact 64A in effect causes a like designated switch 63 in Figure 3 to close a contact 64A to change the temperature of a control system from a fixed ceiling to one which is variable by movement of the pilot's power control lever 46 as indicated in Figures 3 and 4.

The de-energization of the electromagnet 240 causes a movable contact 251 to open contact 251A and close contact 251B to cause a like indicated switch 251 in the system of Figure 3 to close a contact for transferring the reset transformer from the arrangement of ground operation to that of flight operation indicated in Figure 3.

Furthermore, the de-energization of electromagnet 240 closes a movable contact 61 to open contact 62 and closes contact 62B to in effect cause a like indicated switch 61 in the system of Figure 3 to connect into the mixer system 60 signals for operation of the regulator system during normal flight operation.

Operation of overspeed control

During ground idle operation the secondary winding 203 provides a signal voltage of a phase which is opposed by the signal voltage of the transformer 102 which is of opposite phase and, therefore, so long as the signal voltage across the output lines 200—205 of the primary winding 203 does not exceed the signal voltage of the transformer 102 no signal passes through the phase selector 208. However, as the speed of the turbine 20 increases the rotor winding 100 is adjusted so as to decrease the voltage induced in the stator winding 104 until at the predetermined maximum speed of, for example, 6000 R. P. M. the signal voltage at the output lines 200—205 exceeds that of the signal voltage from the transformer 102 so that thereupon a signal voltage passes through the phase selector 208. Such signal voltage passed by the phase selector 208 effects the amplifier 87 and actuator motor 82 so as to adjust the throttling valve 41 to decrease the fuel supply to decrease the engine temperature and speed so that during normal ground idle operation the engine operates at a steady predetermined speed of, for example, 6000 R. P. M.

Now upon the switch 230 being adjusted to close contact 230B for connecting line 207 to line 209 as during normal ground operation a signal voltage is supplied by output lines 205—209 of the secondary winding 213 instead of the secondary winding 203. The signal voltage supplied by the secondary winding 213 will be in phase with that supplied by transformer 102 at the first predetermined speed of, for example, 6000 R. P. M., but as the speed of the turbine 20 increases adjustment of the rotor winding 100 by the fly-ball governor 27 causes an inversion in the signal voltage induced in the stator winding 104 of the transformer 102 until as a predetermined speed of, for example, 7088 R. P. M. is approached, the signal voltage induced in the stator winding 104 of opposite phase tends to balance that induced in the secondary winding 213 and upon this predetermined speed being exceeded the signal voltage induced in the winding 104 exceeds that in the secondary winding 213 and passes the phase selector 208 so as to cause actuator motor 82 to move in a direction to decrease the fuel supply to the combustion chamber 12 to decrease the engine temperature and speed so that during normal ground operation the engine operates at a steady predetermined speed of, for example 7088 R. P. M.

Now upon the switch 245 being adjusted so as to open contact 245A and close contact 245B so as to transfer from output line 209 to output line 209A a higher predetermined speed is selected of, for example, 7200 R. P. M. and upon the rotor winding 100 being further adjusted by the fly-ball governor in a speed increasing direction the voltage induced in stator winding 104 exceeds that across the output lines 205 and 209A to limit the speed of the turbine at the predetermined speed of 7200 R. P. M.

It will be seen from the foregoing that the speed sensing unit of Figure 1 is the same fly-ball governor 27 and transformer 102 which is used during normal operation to supply speed sense to the electronic control system in terms of a voltage signal. For the start cycle, however, this speed transformer 102 is coupled to the reset transformer 107 which acts as servo operated follower of speed as shown in Figure 1. The reset transformer 107 during normal ground idle and ground operation is coupled in series with the follow-up transformer 77 to affect the reset amplifier and thereby the reset actuator motor so as to cause adjustment of the rotor winding 109 in a direction to cancel out the follow-up voltage induced in winding 77 by adjustment of the rotor winding 79 by the valve actuator motor 82 and thereby remove the follow-up temperature drooping effect. In the starting operation such follow-up temperature drooping effect is not removed and as heretofore explained it is a desirable characteristic in the starting operation to have such temperature droop with increasing speed.

In the start cycle a position follower is required and not a voltage follower and to achieve this the stator windings 104 and 105 (speed and reset) are interconnected as shown in Figure 1. The rotor 100 of the speed transformer has an excitation voltage applied, while the rotor of the reset transformer 105 is connected during the starting operation to the input of the reset amplifier 111 as shown in Figure 1. In this way the reset actuator motor 117 acts to crank the rest rotor 109 through shaft 121 to a null position which corresponds to the transformer 100 rotor position and the result is a servo operated speed follower to open and close suitable switches for effecting the several functions in the starting operation heretofore described.

The selected temperature for the start cycle (the controlling factor) is low enough to prevent compressor stall, and at the same time high enough to provide an accelerating torque in the engine throughout the start cycle. The actual control circuit itself is a modified version of that used in normal operation. The "effective follow-up" signal used in the ground idle and ground operation circuit, is not available during a start, since the reset transformer 105 has been taken out of the circuit. A direct follow-up signal is supplied to the circuit in its stead by the adjustment of the rotor winding 79 relative to the winding 77 by the actuator motor 82, as shown in Figure 1. Using a direct follow-up in this manner introduces temperature droop. The maximum variation in temperature directly due to this droop does not exceed 25 degrees Fahrenheit.

The engine after starting will continue to accelerate up to the ground idle R. P. M. At approximately 500 R. P. M. below ground idle the transfer relay controlled by rotary switch 129 switches over to normal operation, ground idle. The starter 36 and ignitor 35 are both arranged to be cut out by suitable rotary switch relay operated means at some point below the transfer R. P. M. The key to a smooth transfer of control functions at this point is the relative position of the reset transformer 107. The position of the reset transformer 107 as a speed follower should closely proximate the position of the reset in the follow-up loop for average ground idle operation.

Having completed the start, all relays used in the start cycle are de-energized and in addition the voltage supply to the start rotary switch is cut off. Repetition of the start cycle, or any portion of it may only be initiated by going through the cut-off position.

*Flight operation*

When the switching mechanism has been adjusted to the position for effecting normal flight operation, as indicated in Figure 3, it will be seen that the ceiling temperature selector 68 for ground operation is cut out of the temperature circuit by the switch 63 and in its stead there is operably connected a transformer 300 having stator windings 302 and rotor winding 303 connected across the main source of alternating current. The rotor winding 303 may be variably positioned through operation of the lever 46 to select the desired temperature.

Further connected in series with the stator windings 302 of the transformer 300 is an output winding 305 of a rate generator 307 having a winding 309 energized from the main source of alternating current and a rotor 310 driven by the actuator motor 82 so as to apply to the temperature responsive loop a follow-up signal voltage proportional to speed of change in position of the throttling valve 41 and tending to retard rapid change of position of the throttling valve 41 so as to maintain stability of control.

The output voltage of the rate generator 307 is also applied across the cathode and grid of an electronic valve 310 so as to cause a cathode plate voltage in the primary winding 312 to produce in the secondary winding 314 of the transformer 316 a follow-up signal voltage. Such follow-up is in turn applied in the overspeed loop so as to tend to retard rapid change in the position of the throttling valve 41 under overspeed conditions and thereby provide stability of control in the overspeed governor.

Furthermore, the adjustment of the switch 61 to open grounded contact 62 and close contact 62B to the mixer system 60 permits the follow-up transformer 77—79 to apply a follow-up signal to the temperature loop which is in turn wiped out by the action of reset transformer 107 having the rotor winding driven by the reset motor 117. It will be also noted that the rate generator 226 applies through the output winding 67 a rate signal to the input of the reset amplifier 111 proportional to the driven speed of the rotor 109 so as to retard rapid change of position of the reset winding 109 and thereby provide stability of control.

The structure hereinbefore described with reference to Figures 1 to 4 is disclosed and claimed in the copending application Serial No. 158,273 filed April 26, 1950 by Sigmund Machlanski now Patent No. 2,741,086 and assigned to Bendix Aviation Corporation.

*Improved features*

The present application is directed to, among other features, a single lever control and operation mechanism hereinafter described with reference to Figures 5 to 10 for use with the control system hereinbefore described and shown with reference to Figures 1–4.

Figures 7, 8:
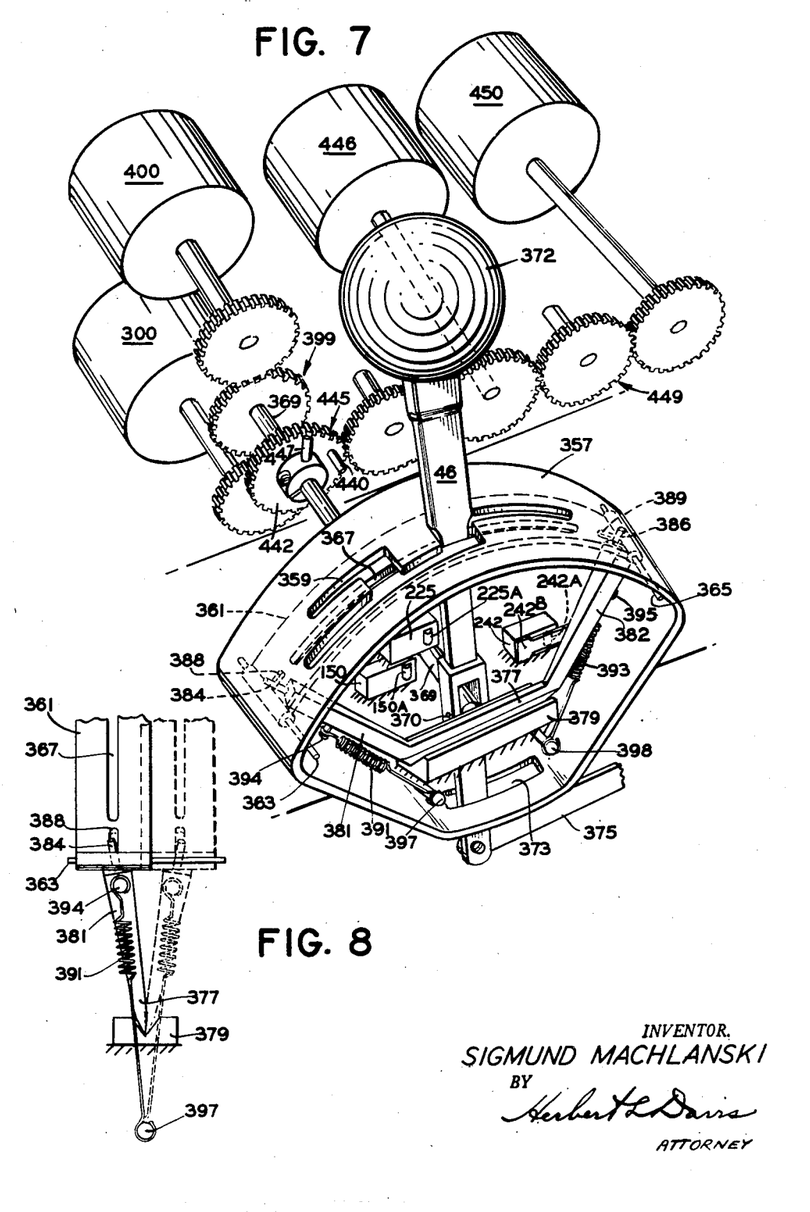
Figure 7 is an exploded view of the operating mechanism for the pilot control of Figure 5.
Figure 8 is an enlarged fragmentary view illustrating the spring toggle action of the shift plate of Figure 7.
Figure 9:
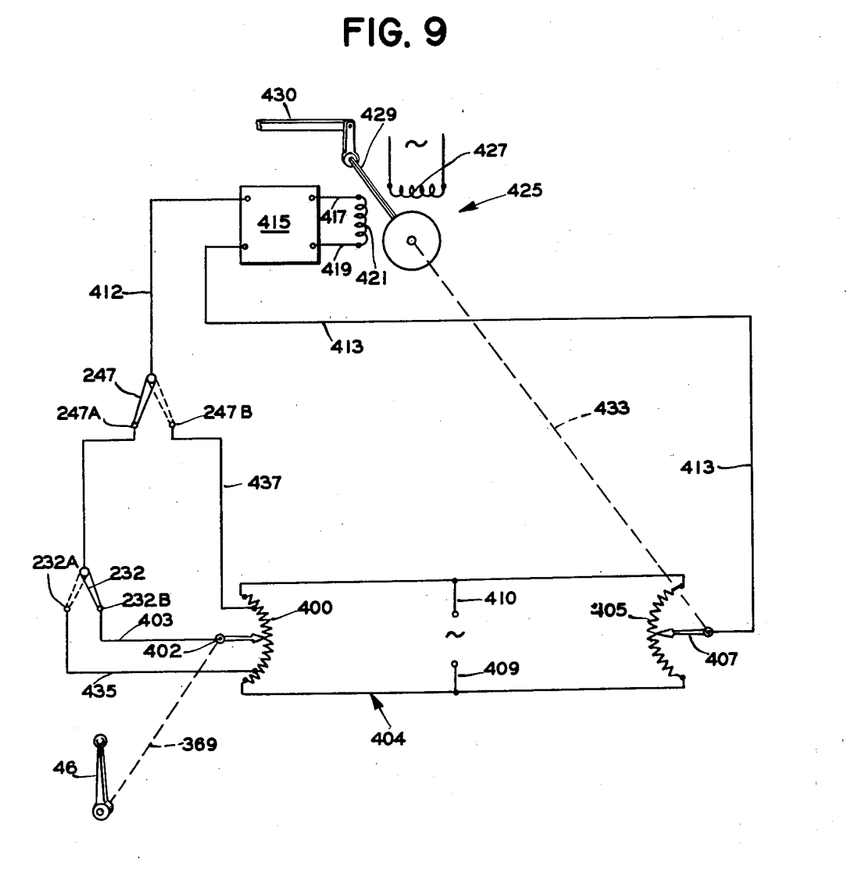
Figure 9 is a diagrammatic view showing the propeller pitch governor control circuit.

The improved unit is used to convey intelligence to the control system through a system of switches 150, 225 and 242 which are actuated by the manual positioning of control lever 46 and also by positioning the rotor element 303 of the temperature selector transformer 300 which is geared to the manually operable control lever 46 as is also rotor arm 402 of a potentiometer 400, shown in Figures 7 and 9, for scheduling the adjustment of the pitch of the propeller 21 during ground operation.

A further feature is the provision of novel means by which the limiting of power and temperature in the engine is achieved. In order to avoid superimposing one control on another, the value of selected temperature which would produce both a safe limit of combustion temperature and safe limit of power output is separately computed by a novel stop computer as a function of several variables affecting these two limiting conditions. A servo operated stop in the control unit is then positioned by the computer so that the control lever 46 cannot be advanced beyond the limited point and so that the control lever 46 remains within a safe operating region. The action of the computer and stop mechanism is such as not to introduce any problems of stability or interference which might otherwise result through the mixing of the electronic circuits involved. The computer and stop mechanism is described and claimed in the copending parent application Serial No. 185,828 filed September 20, 1950 by Sigmund Machlanski, now Patent No. 2,740,255.

*Single lever control unit for conditioning automatic control system*

As shown in Figure 7, the control unit includes a quadrant shaped casing 357 having formed therein a slot 359 within which the lever 46 may be adjustably positioned. The slot 359 is shown in detail in Figure 6.

A plate 361, shown in Figures 7 and 8, is slidably mounted on pins 363 and 365 positioned at opposite ends of the plate 361 and affixed in the casing 357. Formed in the plate 361 is a longitudinal slot 367 in which is slidably mounted the lever 46.

The lever 46 is pivotally mounted on a shaft 369 by a pin 370 at a point intermediate the opposite ends of the lever 46. One end of the lever 46 has a ball 372 affixed thereto for convenient manual operation of the lever 46, while the opposite end of the lever 46 projects from the casing 357 through a slot 373 and is connected through a mechanical linkage 375 to an emergency control not shown herein, but which may be of a type arranged to take over control of the engine upon malfunction of the electronic or primary control with no initiating action required of the pilot. This means that the emergency system controls the engine over the same parameter and to the identical state condition that the control lever 46 designates for the main control system. Thus, malfunction of the electronic or main control system, as indicated by failure to maintain the selected state condition will automatically cut in the emergency control which may be of a type disclosed and claimed in U. S. patent application Serial No. 192,508, filed October 27, 1950, now Patent No. 2,763,986.

Figure 6:
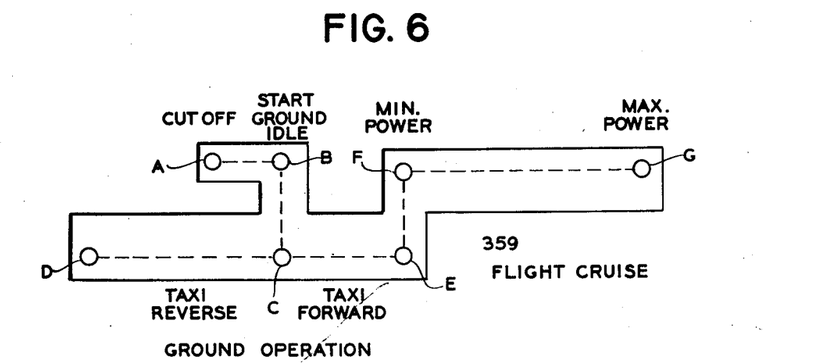
Figure 6 is a diagrammatic view showing the schedule of operation of the pilot control.

The lever 46 may be pivoted on the pin 370 as the lever 46 is adjusted laterally in the slot 359 from position B to position C and from position E to position F, as indicated in Figure 6. Such lateral pivotal adjustment of the lever 46 will cause the plate 361 to move laterally with the lever 46 with a snap action, as indicated in Figures 7 and 8.

The latter snap action is effected through operation of a U-shaped toggle bar 377 pivotally mounted in a bearing member 379 carried by the casing 357. The toggle bar 377 has arms 381 and 382 projecting from the opposite ends thereof. Projecting from the free ends of arms 381 and 382 are pins 384 and 386 positioned in suitable slots 388 and 389, respectively, provided in the plate 361 and cooperating with the plate 361.

Spring elements 391 and 393 are connected to the respective arms 381 and 382 by pins 394 and 395, respectively, and to the casing 357 by pins 397 and 398, respectively.

As shown by Figure 8, lateral movement of the shift plate 361 slidably mounted on the pins 363 and 365 may be effected through operation of the lever 46 as upon adjustment thereof from position B to position C or from position E to position F of Figure 6. Such lateral movement will cause the spring elements 391 and 393 to bias the shift plate 361 and thereby the lever 46 to the latter position C or F with a snap action as the arms 381 and 383 pass through the center point of the bearing member 379.

Three switch mechanisms 150, 225 and 242 are mounted within the quadrant shaped casing 357 and are arranged for operation by the positioning of the control lever 46. The switch mechanisms 150, 225 and 242 serve to determine the operating conditions of the control system as heretofore explained with reference to Figure 2.

The switch mechanisms 150, 225 and 242 may be of a conventional snap action type, well known in the art in which the switch mechanisms 150 and 225 are normally biased by suitable spring means to a circuit open position while the switch mechanism 242 is normally biased by suitable spring means to a circuit closed position.

The switch mechanism 150 has a switch actuating member 150A which is engaged by the lever arm 46 when in the "cut-off" position A of Figure 6 so as to cause the switch mechanism 150 to be actuated to a circuit closing position.

Upon arcuate movement of the lever arm 46 from the "cut-off" position A to the "start" position B, the lever arm 46 disengages the switch actuating member 150A, whereupon the switch mechanism 150 is released to a circuit open position for initiating operation of the automatic starting control as heretofore described with reference to Figures 1–4.

The switch mechanism 225 has a switch actuating member 225A which is engaged by the lever 46 when in the "start-ground idle" position B so as to cause the switch mechanism 225 to be actuated to a circuit closing position for effecting "ground idle" operation of the control system as described with reference to Figures 1–4.

Upon lateral movement of the lever arm 46 from the "start-ground idle" position B to "ground operation" position C of Figure 6, the lever arm 46 disengages the switch actuating member 225A, whereupon the switch mechanism 225 is released to a circuit open position for conditioning the control system for "ground operation" upon the starting operation being effected through the automatic starting control, as described with reference to Figures 1–4.

The switch mechanism 242 has a switch actuating member 242A operated by a resilient arm 242B which is actuated by the arm 382 of the toggle bar 379 so as to cause the switch mechanism 242 to be actuated to a circuit open position, upon lateral movement of the lever arm 46 from the taxi forward position E to the flight operation position F causing in turn the shift plate 361 and the toggle arm 382 to move laterally to effect actuation of the resilient arm 242B to open switch 242.

During arcuate movement of the lever arm 46 in the "ground operation" range of positions C, D and E, the resilient arm 242B releases the switch actuating member 242A so as to permit the switch mechanism 242 to assume its normal closed circuit position for effecting "ground operation," as heretofore described with reference to Figures 1–4.

*Propeller pitch control*

As shown in Figure 7, arcuate motion of the control lever 46 in "ground operation" affects through shaft 369 and gearing 399 the position of an adjustable contact arm on a potentiometer 400 controlling the pitch of the propeller blade 21. The adjustable contact arm is indicated diagrammatically in Figure 9 by the numeral 402 and is electrically connected through a conductor 403 to the relay contact 232B. The potentiometer 400, as shown in Figure 9, provides opposite arms of a normally balanced bridge circuit 404 which may be of conventional type. The bridge circuit 404 includes a second potentiometer 405 having an adjustable arm 407 and a source of alternating current connected by conductors 409 and 410 across the bridge circuit 404.

Upon the control system of Figure 2 being in "ground operation" with switch 232 closing contact 232B and switch 247 closing contact 247B, as indicated in Figure 9, the arm 402 and arm 407 are connected by conductors 412 and 413 to the input of a suitable amplifier 415 of conventional type having output conductors 417 and 419 connected to a control winding 421 of a two phase motor 425 of conventional type. The motor 425 has a fixed phase winding 427 connected across the source of alternating current.

The motor 425 is arranged to adjust through a shaft 429 and linkage 430 the setting of the propeller pitch control mechanism 29 upon an adjustment of the lever 46 and contact arm 402 unbalancing the bridge circuit 404. The arm 407 is likewise adjusted by the motor 425 through a shaft 433, indicated by dotted lines in Figure 9 in a direction to rebalance the bridge circuit 404.

A positioning of the control lever 46 in the "ground operation" range C—E affects through the mechanism 29 the angle of the propeller blades 21 in a positive pitch range for the taxiing of the aircraft on the ground in a forward direction, while adjustment of the control lever 46 in the "ground operation" range C—D effects through the mechanism 29 the angle of the propeller blades 21 in a negative pitch range for the taxiing of the aircraft on the ground in a reverse direction. The adjustment of the control lever 46 to the position C effects adjustment of the propeller blades 21 to a neutral position.

However, during "ground idle operation" with the control lever 46 at the position B the switch 225 is closed causing the relay switch 232 to close contact 232A and open contact 232B. The contact 232A is connected through a conductor 435 to a fixed point on the potentiometer 400 for the selection of minimum torque or a minimum angle of pitch for the propeller blades 21 effective during "start" and "ground idle" operation.

Adjustment of the control lever 46 from the "ground operation" position E to the "flight cruise" minimum power position F opens the flight operation switch 242 thus de-energizing the relay winding 240 of Figure 2 and causing relay switch 247 to open contact 247A and close contact 247B. The contact 247B is connected through a conductor 437 to a fixed point on the potentiometer 400 for effecting through bridge circuit 404 and motor 425 a speed setting adjustment of the control mechanism 29 for flight operation.

The point at which conductor 437 is connected to the potentiometer 400 is such as to cause through motor 425 an adjustment of the mechanism 29 in excess of that effected in either "start-ground idle" or "ground operation." Upon such adjustment of the mechanism 29 for flight operation, the mechanism 29 serves to maintain the speed of the engine at a predetermined value by varying the pitch of the propeller 21 through the operation of a suitable speed responsive means well known in the art. The mechanism 29 is not shown in detail, but may be of a suitable type well known in the art.

During ground idle and ground operation, the pitch of the propeller 21 is adjusted through operation of the mechanism 29 to predetermined angular positions, for example, during "start ground idle" operation to $-5°$ blade angle, while during "ground operation" to blade angles from $-25°$ to $+9°$, respectively depending on the position of the control lever 46 within the range D-C-E. During such "start-ground idle" and "ground operation" the speed of the engine is controlled by a speed governor in the control system of Figures 1 and 3 which varies the fuel to maintain preselected speed settings and also controls the fuel on accelerations to maintain selected maximum temperatures. In flight operation, the speed of the engine is maintained at a predetermined value by varying the load of the variable pitch propeller 21 controlled by the propeller control mechanism 29 in response to the speed of the engine. The control system of Figure 3 during such flight operation varies the fuel flow so as to maintain a selected turbine temperature corresponding to the position of the power control lever 46.

Engine temperature control and safety stop means

Motion of the control lever 46 in the "flight cruise" range affects the temperature setting of the control circuit by adjustment of the temperature selector transformer 300 which has the rotor winding 303 mechanically coupled to the control lever 46 through the gearing 399 and shaft 369. The transformer 300 produces a signal input to the temperature control circuit, as heretofore described with reference to Figure 3.

In operation, however, the maximum position of the control lever 46 is limited, as shown in Figure 7, by a servo operated stop pin 440 carried by an idler gear 442 rotatably mounted on the shaft 369 and adjustably positioned through gearing 445 by a motor 446 under control of a maximum engine power and combustion temperature computer mechanism, described and claimed in copending parent application Serial No. 185,828 filed September 20, 1950, by Sigmund Machlanski, now Patent No. 2,740,255. A dog 447 clamped to the shaft 369 is arranged to come into contact with the stop pin 440 in the limiting position. The motor 446 is further arranged so as to adjust through gearing 449 the rotor element of a follow-up transformer 450 in the computer mechanism.

Figure 5:
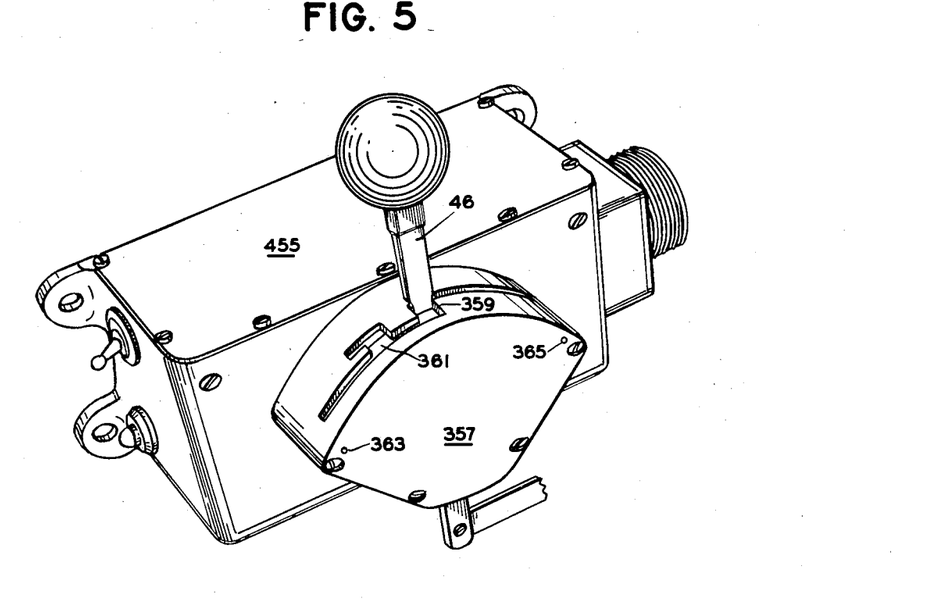
Figure 5 is a perspective view of the novel pilot control for the system.

The temperature selector transformer 300, propeller pitch control potentiometer 400, servomotor 446 and follow-up transformer 450, together with the gearing 399, 445, 449 and idler gear 442 and dog 447 are mounted within a control box 455 affixed to the casing 357, as shown in Figure 5.

Computer mechanism

The prime function of the control system, as previously stated, is to regulate the fuel flow to the engine in such quantity as to achieve a selected power setting within safe limitations of the engine. Temperature and speed are limited by actually measuring these quantities and restricting fuel flow when the selected limits have been reached. However, under certain conditions, it is possible to be within these limits and yet exceed the maximum allowable shaft torque that may safely be applied to the engine output shaft or exceed safe operating engine temperatures. It is the purpose of the stop computer, shown schematically in Figure 10, to compute and impose these limiting factors into the primary system. The stop computer senses ram inlet pressure, compressor inlet temperature and tail pipe temperature and converts these into proper positioning of the mechanical stop 440, which acts to limit fuel flow so as not to exceed the permissible values as calculated by the computer. If flight conditions change to make the pilot's selected power unsafe, the stop computer will automatically reset the effective position of the control lever 46 to a new maximum safe value by overriding the previous position of the lever 46.

The criteria for safe engine operation are maximum safe temperature and maximum safe power as defined by certain constant factors dependent upon the characteristics of the engine under consideration and certain variable factors, as indicated below wherein:

$P_1$=Ram air inlet duct pressure in p. s. i. abs.
$T_1$=Ram air inlet duct temperature in degrees Rankine.
$T_3$=Turbine inlet temperature in degrees Rankine.
$T_4$=Tailpipe or exhaust gas temperature in degrees Rankine.

Since the control lever 46 selects $(T_3-T_1)$ it follows that the maximum allowable $(T_3-T_1)$ must be the computed quantity which will stop the control lever 46 at positions corresponding to the safe values of $(T_3-T_1)$ for both maximum power and temperature.

Such safe values vary with the following factors:

1. Maximum allowable $T_3$ varies with the factors $$\frac{P_1}{T_1}$$

2. Maximum allowable power varies with $$\frac{P_1}{T_1}[(T_3-T_4)]$$

Formulas 1 and 2 may be rearranged to express the maximum safe $(T_3-T_1)$ as functions of the variable factors $P_1$, $T_1$ and $T_4$ in which such safe values vary with the following factors:

3. Maximum $T_3-T_1$ for safe engine temperature will vary with the factors $$\frac{P_1}{T_1}-T_1$$

4. Maximum $T_3-T_1$ for safe engine power will vary with the factors $$\frac{T_1}{P_1}+(T_4-T_1)$$

Figure 10:
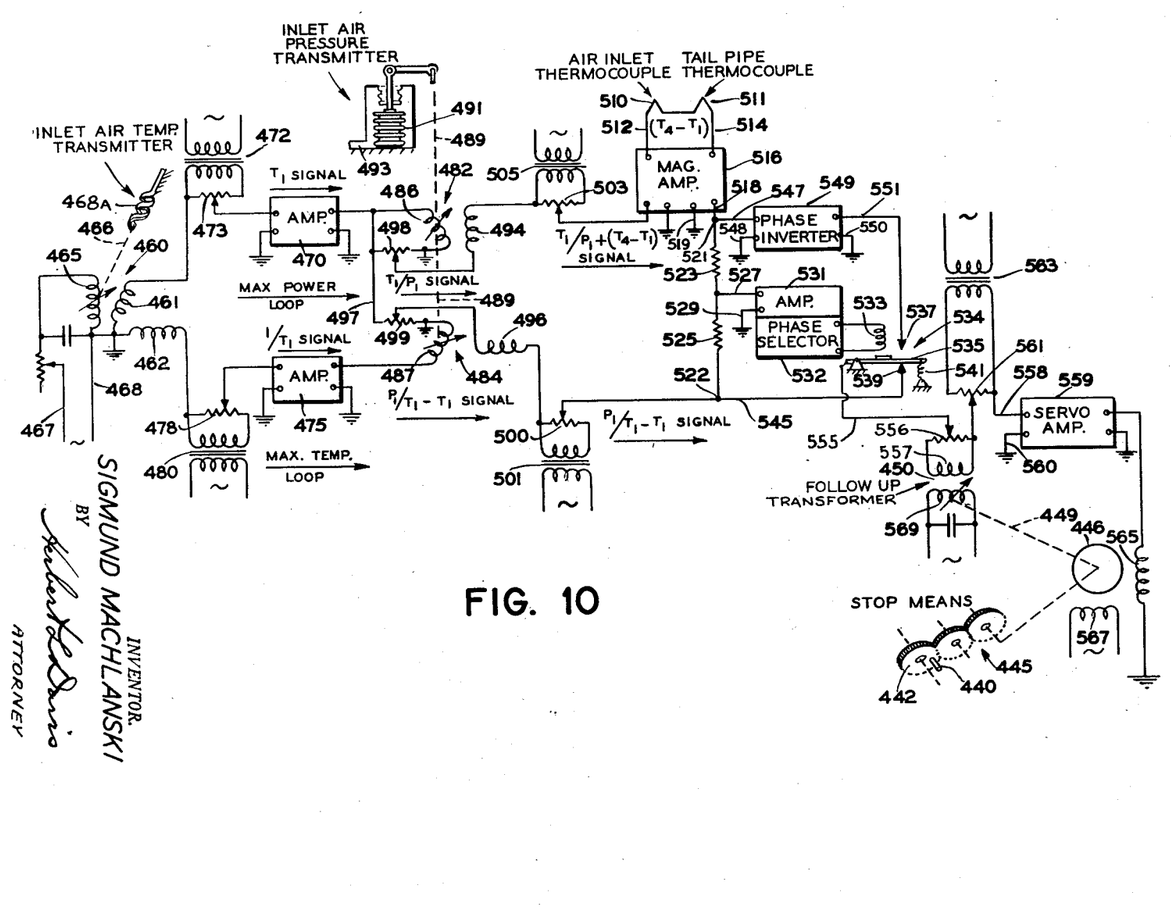
Figure 10 is a diagrammatic view showing the stop computer for the control system.

The measured quantity $T_1$, as shown diagrammatically in Figure 10, is induced into the computer by an air inlet temperature transmitter which includes a variable coupling transformer 460 having stator windings 461 and 462 inductively coupled to a rotor winding 465 connected across a main source of alternating current through conductors 468 and 468A. The rotor winding 465 is adjustably positioned through shaft 466 by an air inlet temperature sensive bimetal spiral 467 of conventional type and which may be positioned in the air inlet duct as indicated in Figure 4. There is induced in the stator windings 461 and 462 a voltage which is equivalent of $$T_1 \text{ and } \frac{1}{T_1}$$

respectively.

The reciprocal $$\frac{1}{T_1}$$

is derived by curve fitting, a method well known in the art. The sine function developed by the resolver or transformer 460 is displaced and expanded in rectangular coordinates so that over the required range of operation a portion of the sine function approximately matches the required rectangular hyperbola.

The output of stator winding 461 is connected to the input of an amplifier 470 of conventional type subject to a biasing voltage introduced through the transformer 472 and resistor 473 to avoid the zero point of the variable coupling transformer 460. The output of the stator winding 462 is connected to the input of an amplifier 475 of conventional type and is subject to a biasing voltage applied through resistor 478 and transformer 480 to avoid the zero point of the transformer 460.

The measured quantity $P_1$ is inserted into the output of amplifier 470 of the maximum power loop and the output of the amplifier 475 of the maximum temperature loop by an inlet air pressure transmitter including two transformers 482 and 484 having rotor windings 486 and 487, respectively, mechanically coupled by a common rotor shaft 489 which is in turn rotated by a pressure sensitive bellows 491 subject to inlet air pressure, as indicated in Figure 4, applied through a conduit 493. The rotor winding 486 is connected to the output of amplifier 470 and is inductively coupled to a stator winding 494 while the rotor winding 487 is connected to the output of amplifier 475 and is inductively coupled to the stator winding 496.

For small ratios of $P_1$ of the order of $$\frac{2.5}{1}$$

the factor $$\frac{1}{P_1}$$

can be approximated using the sinusoidal output of a variable coupling transformer by an equation having the form $A+B$ sine $P_1'$; where $P_1'$=variable coupling transformer rotation equivalent to $P_1$, p. s. i. absolute.

Therefore, generation of a voltage equivalent to the term $$\frac{T_1}{P_1}$$

may be accomplished with the approximate form $T_1(A+B$ sine $P_1')$ which expanded is $[AT_1+BT_1$ sine $P_1]$.

The value $BT_1$ sine $P_1$ is derived by imposing an excitation on the rotor winding 486 which is proportional to $T_1$ and positioning the rotor winding 486 by the pressure transmitter 491 proportional to $P_1$ so that the induced voltage in the stator winding 494 is equivalent to the factor $BT_1$ sine $P_1$. Now to this signal voltage there is added through conductor 497 and resistor 498 a biasing voltage which is proportional to $T_1$ and represents the factor $AT_1$ so that the resultant signal approximates $$\frac{T_1}{P_1}$$

There is imposed on the rotor winding 487 an excitation voltage proportional to $$\frac{1}{T_1}$$

while there is induced in the stator winding 496 by the rotor winding 487 a voltage proportional to $$\frac{P_1}{T_1}$$

There is further applied to the stator winding 496 through conductor 497 and resistor 499 an opposing signal voltage proportional to $T_1$ so that the output signal voltage of stator winding 496 is proportioned to $$\frac{P_1}{T_1}-T_1$$

It will be seen then that the measured quantity of the signal for the Maximum Temperature Loop of $$\frac{P_1}{T_1}-T_1$$

is effected at the output of the winding 496 to which there is applied a biasing voltage through resistor 500 and transformer 501 to avoid the zero point of the variable coupling transformer 484. A similar biasing voltage is applied through resistors 503 and transformer 505 to the output of the stator winding 494 of the maximum power loop.

In order to meet the formula for the measured quantity of maximum power, there is added to the output of the stator winding 494 a signal voltage equivalent to the difference between air inlet temperature $T_1$ and that of the tailpipe or exhaust gas temperature $T_4$. Since this quantity cannot feasibly be measured by variable coupling transformer angular displacement due to the high temperature values of the tailpipe temperature a thermocouple 510 mounted in the air inlet and a thermo-couple 511 mounted in the tailpipe, as shown in Figure 4, are provided with the desired characteristics. The thermocouples 510 and 511 are connected in opposing relation so that the control signal energizing output lines 512 and 514 will represent $T_4-T_1$ or the difference between the temperatures at the compressor inlet 5 and at the tailpipe or exhaust 23. The output of the thermocouples 510 and 511 is connected by conductors 512 and 514 through a magnetic amplifier 516 of conventional type to the output of the winding 494. The output of the magnetic amplifier 516 is applied through conductors 518 and 519. The resultant signal voltage at the output lines 518 and 519 is proportional to the measured quantity $$\frac{T_1}{P_1}+(T_4-T_1)$$

for the maximum power. The computed voltage signal for maximum safe power and temperature appears at points 521 and 522, respectively, of Figure 10.

The stop mechanism being a protective device must select the lower computed quantity to establish the control quantity or stop angle, for if the opposite condition is obtained then the control lever 46 could be advanced to a greater value, say for safe temperature than for maximum safe power and thus maximum safe power might well be exceeded. The difference of the voltages existing at point 521 and point 522 appears between ground and the junction of the two resistance elements 523 and 525 connected in series across these points. Because the two loop voltages are arranged of opposite phase the difference is characterized by the same phase as the larger voltage. The "difference voltage" is now applied through input conductors 527 and 529 to amplifier 531 and through a phase selector 532 to a control winding 533 of a relay 534. The phase selector 532 may be of conventional type and so designed that the "difference voltage" when of the same phase as the output of the maximum temperature loop such "difference voltage" will pass through the phase selector so as to cause energization of the relay winding 533, while the "difference voltage" when of an opposite phase and similar to that of the maximum power loop will not be permitted to pass through the phase selector 532. The control winding 533 when energized will actuate switch 535 so as to close contact 537 and open contact 539. A spring element 541 normally biases the relay switch 535 so as to close contact 539 and open contact 537. Upon energization of the relay winding 533 indicating that the "maximum power loop" has computed a lower $T_3-T_1$ value than the "maximum temperature loop" the switch 539 will close contact 537. The output of the maximum temperature loop is connected by conductor 545 to the contact 539, while the output of the maximum power loop is connected by a conductor 547 and grounded conductor 548 to the input of a phase inverter 549 of conventional type. Grounded conductor 550 and conductor 551 lead from the output of the phase converter 549. Output conductor 551 leads to contact 537. The switch arm 535 is connected by a conductor 555 to a resistor 556 connected across a stator winding 557 of the follow-up transformer 450 and to which there is applied by the stator winding 557 a follow-up voltage. The resultant of the signal and follow-up voltages are applied through the conductor 558 to the input of servo amplifier 559 of conventional type. The opposite input conductor 560 of the amplifier 559 is grounded.

There is applied to the input conductor 558 a biasing voltage through resistor 561 and transformer 563 for avoiding the zero point of the follow-up transformer 450. The output of the servo amplifier 559 is connected across a control winding 565 of the servomotor 446, shown as of a conventional two phase type. The motor 446 may have a fixed phase winding 567 connected across the main source of alternating current. Motor 446 drives a rotor winding 569 of the follow-up transformer 450. The latter rotor winding 569, as shown, is connected across the main source of alternating current and is arranged to induce in the winding 457 a voltage of opposite phase to that of the control voltage applied through switch 535 and normally balancing the control voltage when stop 440, adjusted by motor 446, is at the safe limit position.

When the stop 440 is not at the safe calculated limit position, the position of rotor winding 569 is such as to cause a difference voltage to be applied to the input of amplifier 559 which is turn affects control winding 565 so as to cause motor 446 to rotate in a direction so as to cause the follow-up rotor winding 569 to be adjusted so as to wipe out the difference voltage when the stop 440 has been adjusted by the motor 446 to the calculated position.

The phase selector 532 and relay 534 are so designed that the loop signal voltage calling for equal or lesser computed $(T_3-T_1)$ passes through the follow-up system. The phase inverter 549 is required to restore the maximum power loop voltage to the same phase as the maximum temperature loop voltage.

The final action of the stop computer is effected in the control box 455 where the computed voltage representing the lesser computed $(T_3-T_1)$ positions the stop 440 at an angle equivalent to that which would represent a safe value for both maximum power and maximum temperature. To illustrate the stop action by an example, assume that in flight condition the pilot calls for more thrust from the engine. He will then advance the control lever 46 to some new position thereby selecting a higher value of $(T_3-T_1)$. If, at the moment the throttle is advanced the variables composing the Equations 3 and 4 have values making each function greater than the selected $(T_3-T_1)$ then the pilot could advance the control lever 46 to the limit of its movement.

If, on the other hand, the conditions are such that the computed function value of the lesser $(T_3-T_1)$ was less than the pilot selected $(T_3-T_1)$, a forward motion of the control lever 46 by the pilot's hand would be stopped at the angle computed by the stop means 440. In the event the pilot's selected $(T_3-T_1)$ is safe, but over a period of time changes in the altitude and speed have occurred to make the computed $(T_3-T_1)$ less than the original control lever setting then the stop means 440 will mechanically reduce the selected setting to the maximum safe value. The stop computer under dynamic conditions can only retard the control lever 46 and any advance of the control lever 46 must be made by the pilot.

Although only one embodiment of the invention has been illustrated and described, various changes in the form and relative arrangements of the parts may be made to suit requirements.

What is claimed is:

1. An aircraft engine control comprising in combination a main control element, first means for initiating starting of said engine, second means to control the engine for ground operation of the aircraft, third means to control the engine for flight operation of the aircraft, a shaft operatively connecting said second and third mentioned means to said control element, switch means actuated by said control element upon arcuate movement of said control element to a first control position for selectively effecting operation of said first means, second switch means actuated by said control element upon lateral movement of said control element relative to said shaft to a second control position for selectively effecting operation of said second means, said control element then arcuately movable within a second range to control the engine during ground operation of the aircraft, and third switch means actuated by said control element upon lateral movement of said control element relative to said shaft to a third control position for selectively discontinuing operation of said second means and effecting operation of said third means, said control element then arcuately movable within a third range to control the engine during flight operation of the aircraft.

2. The combination defined by claim 1 including stop means effective during flight operation of the aircraft to limit the control of the third control means in such a manner that the engine is regulated to within safe operating engine conditions, and engine condition responsive means for positioning said stop means in accordance with the prevailing engine conditions.

3. An aircraft engine control comprising in combination a main control element, first means for initiating starting of said engine, second means to control the engine for ground operation of the aircraft, third means to control the engine for flight operation of the aircraft, means mechanically connecting said second and third mentioned means to said control element, means actuated by said control element upon movement of said control element in a first sense for selectively effecting operation of said first means, other means actuated by said control element upon movement of said control element in a second sense for selectively effecting operation of said second means, said control element then movable in a third sense to control through said mechanical connecting means the second means and thereby the engine during ground operation of the aircraft, and additional means actuated by said control element upon movement of said control element in a fourth sense for selectively discontinuing operation of said second means and effecting operation of said third means, said control element then movable in a fifth sense to control through said mechanical connecting means the engine during flight operation of the aircraft.

4. The combination defined by claim 3 including stop means carried by said mechanical connecting means for limiting control of said third control means to within a predetermined safe range.

5. The combination defined by claim 3 including stop means carried by said mechanical connecting means for limiting control of said third control means to within a predetermined safe range, and engine condition responsive means for adjustably positioning said stop means in accordance with the prevailing engine conditions.

6. The combination defined by claim 3 including switch means operated by the movement of said control element in said first, second and fourth senses for selectively effecting operation of said first, second and third means, stop means effective during flight operation of the aircraft to limit the control of the engine to within safe operating engine conditions, and engine condition responsive means for adjustably positioning said stop means in accordance with the prevailing engine conditions.

7. An aircraft engine control comprising in combination a main control element, first means for initiating starting of said engine, second means to control the engine for ground operation of the aircraft, third means to control the engine for flight operation of the aircraft, means operatively connecting said second and third mentioned means to said control element, means actuated by said control element upon movement of said control element to different adjusted positions for selectively effecting operation of said first, second and third means, said control element adjustable within a first range to control the engine during ground operation and adjustable within a second range to control the engine during flight operation, and adjustable stop means for limiting the control of said third means and thereby said engine during flight operation to within predetermined safe operating conditions.

8. An aircraft engine control comprising in combination a main control element, first means for initiating starting of said engine, second means to control the engine for ground operation of the aircraft, third means to control the engine for flight operation of the aircraft, means operatively connecting said second and third mentioned means to said control element, means actuated by said control element upon movement of said control element to different adjusted positions for selectively effecting operation of said first, second and third means, said control element adjustable within a first range to control the engine during ground operation and adjustable within a second range to control the engine during flight operation, adjustable stop means for limiting the control of said third means and thereby said engine during flight operation to within predetermined safe operating conditions, and engine condition responsive means for adjustably positioning said stop means in accordance with the prevailing engine conditions.

References Cited in the file of this patent

UNITED STATES PATENTS

| | | |
|---|---|---|
| 2,397,978 | Paulus | Apr. 9, 1946 |
| 2,640,550 | Knapp et al. | June 2, 1948 |
| 2,485,431 | Chudyk | Oct. 18, 1949 |
| 2,497,414 | Mossman | Feb. 14, 1950 |
| 2,570,591 | Price | Oct. 9, 1951 |
| 2,634,067 | McCoy et al. | Apr. 7, 1953 |
| 2,654,086 | Pine et al. | Sept. 29, 1953 |
| 2,683,965 | Nagely | July 20, 1954 |

FOREIGN PATENTS

| | | |
|---|---|---|
| 625,176 | Great Britain | June 23, 1949 |

OTHER REFERENCES

Ser. No. 281,826, Stieglitz et al. (A. P. C), published May 18, 1943.